United States Patent
Ren

(10) Patent No.: US 12,467,795 B1
(45) Date of Patent: Nov. 11, 2025

(54) TEMPERATURE BUFFERING DEVICE

(71) Applicant: STN Instruments LLC, Portland, OR (US)

(72) Inventor: Chengxia Ren, Portland, OR (US)

(73) Assignee: STN Instruments LLC, Portland, OR (US)

( * ) Notice: Subject to any disclaimer, the term of this patent is extended or adjusted under 35 U.S.C. 154(b) by 0 days.

(21) Appl. No.: 19/076,322

(22) Filed: Mar. 11, 2025

(51) Int. Cl.
*G01K 1/08* (2021.01)
*G01K 15/00* (2006.01)

(52) U.S. Cl.
CPC .............. *G01K 1/08* (2013.01); *G01K 15/005* (2013.01)

(58) Field of Classification Search
CPC ................................ G01K 1/08; G01K 15/005
USPC ........................................ 374/208, 1
See application file for complete search history.

(56) References Cited

U.S. PATENT DOCUMENTS

| | | | | |
|---|---|---|---|---|
| 6,018,956 A | * | 2/2000 | Sakata | G01K 1/14 62/130 |
| 2017/0307446 A1 | * | 10/2017 | Hegedus | F25D 29/008 |
| 2019/0346200 A1 | * | 11/2019 | McMahon | F25D 13/00 |

FOREIGN PATENT DOCUMENTS

| | | | | |
|---|---|---|---|---|
| CN | 103620359 A | * | 3/2014 | ............... G01K 7/42 |
| CN | 113418636 A | * | 9/2021 | |
| EP | 0928935 A2 | * | 7/1999 | ............ F25D 29/005 |
| WO | WO-2011129689 A1 | * | 10/2011 | ............. G01K 15/00 |

OTHER PUBLICATIONS

Translation of CN113418636A.*
CIK Solutions, "Temperature Probe Buffer Types for Pharmaceutical & Biotech Temperature Monitoring Applications", available from internet https://www.cik-solutions.com/en/datalogger-monitoring-systems/vaisala-applications/probe-buffer, retrieved on Mar. 6, 2025.
TELEMETRY2U Online Store "Premium Aluminum Temperature Buffers", available from internet https://shop.telemetry2u.com/t2u-aluminium-temperature-buffers?srsltid=AfmBOopBNDKN7W7IxoY7K3Uy7qyf9C7pmnlp4wfQB9C192vCa0WEgtuC, retrieved on Mar. 6, 2025.

* cited by examiner

*Primary Examiner* — Mirellys Jagan

(57) ABSTRACT

A temperature buffering device is provided for damping a temperature fluctuation measured by a temperature probe in a temperature-controlled environment. The temperature buffering device includes a body having a top wall, a sidewall and a bottom wall, and a chamber is formed by the top wall, the sidewall and the bottom wall form a chamber; a first probe holder positioned on the top wall and adapted to receive a first temperature probe; and a second probe holder positioned on the top wall and adapted to receive a second temperature probe. The body is made of thermally conductive material, and an inner diameter of the chamber is greater than a thickness of the sidewall. The air in the chamber and the body are configured to function as a buffer to damp the temperature fluctuation.

19 Claims, 4 Drawing Sheets

TEMPERATURE BUFFERING DEVICE

FIELD

This disclosure relates to a temperature buffering device. More specifically, the disclosed embodiments relate to a temperature buffering device for damping a temperature fluctuation in a temperature-controlled environment.

BACKGROUND

In temperature controlled environments such as vaccine refrigerators and vaccine freezers, the temperature is required to maintain within certain ranges by regulatory agency. These temperatures must be continuously monitored to ensure compliance. The accurate reading of a temperature probe is important in temperature monitoring. The temperature reading can be affected by sudden environmental changes such as opening and closing of a refrigerator/freezer door, which results in spikes in temperature reading and can cause false alarms in the temperature monitoring system. A liquid buffer has been used in which a temperature probe is placed in a liquid solution (e.g., glycol or water) to damp the temporary temperature changes. Another buffer type is an aluminum buffer in which an aluminum block is used as a buffer and a temperature probe is inserted into a hole in the aluminum block.

SUMMARY

The present disclosure provides a temperature buffering device relating to damp temperature fluctuations such that the temperature measured by a temperature probe more accurately reflects the temperature changes of the stored items in the temperature-controlled environment.

In one aspect of the present disclosure, a temperature buffering device is provided for damping a temperature fluctuation measured by a temperature probe in a temperature-controlled environment. The temperature buffering device includes a body having a top wall, a sidewall and a bottom wall, and a chamber is formed by the top wall, the sidewall and the bottom wall; a first probe holder positioned on the top wall and adapted to receive a first temperature probe; and a second probe holder positioned on the top wall and adapted to receive a second temperature probe. The body is made of thermally conductive material, and an inner diameter of the chamber is greater than a thickness of the sidewall. The air in the chamber and the body are configured to function as a buffer to damp the temperature fluctuation.

In another aspect of the present disclosure, a temperature buffering device is provided for damping a temperature fluctuation measured by a temperature probe. The temperature buffering device comprising: a body having a top wall, a sidewall and a bottom wall; a chamber formed by the top wall, the sidewall and the bottom wall to receive a fluid medium; a first probe holder positioned on the top wall and adapted to receive a first temperature probe. The fluid medium received in the chamber and the body are served as buffering mediums to damp the temperature fluctuation. The body is made of metal, and the bottom wall is removably coupled to the sidewall.

In another aspect of the present disclosure, a temperature buffering device is provided for damping a temperature fluctuation measured by a temperature probe. The temperature buffering device comprises a body having a top wall, a sidewall and a bottom wall, and the top wall, the sidewall and the bottom wall form a chamber to receive a fluid medium; a probe holder positioned on the top wall and adapted to receive a temperature probe. The body is made of thermally conductive material; and the fluid medium received in the chamber and the body are configured such that the fluid medium and the body function together to damp transient temperature fluctuations.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 2.

DETAILED DESCRIPTION

Figure 1:
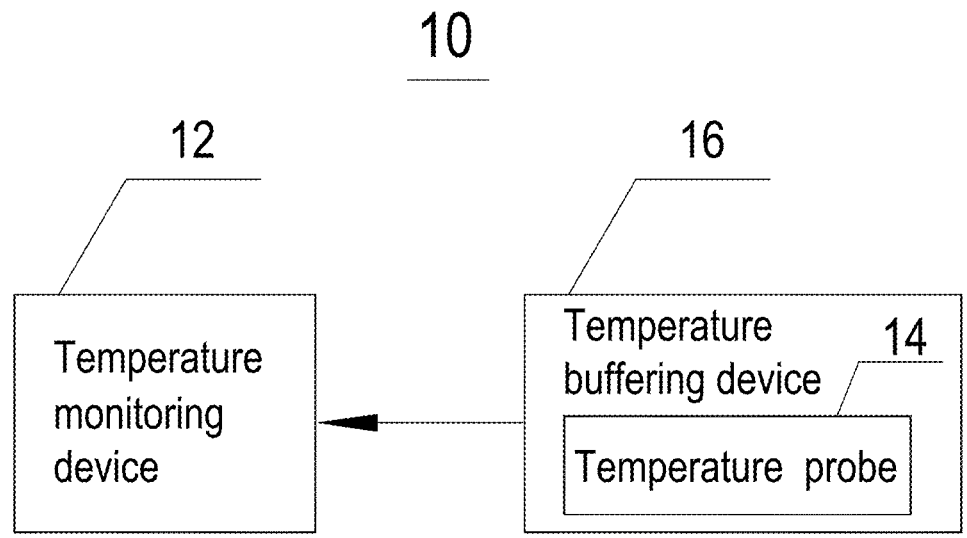
FIG. 1 is a schematic diagram of an illustrative temperature monitoring system in which a temperature buffering device is used.

Various aspects and examples of a temperature buffering device for damping a temperature fluctuation as well as related methods, are described below and illustrated in the associated drawings. Unless otherwise specified, a temperature buffering device for damping a temperature fluctuation in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

Directional terms such as "up," "down," "vertical," "horizontal," "top," "bottom", and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, a subject matter that is recited as being configured to perform a particular function may additionally or alternatively be described as being operative to perform that function.

The phrase, "for example," the phrase, "as an example," and/or simply the term "example," when used with reference to one or more components, features, details, structures, and/or embodiments according to the present disclosure, are intended to convey that the described component, feature, detail, structure, and/or embodiment is an illustrative, non-exclusive example of components, features, details, structures, and/or embodiments according to the present disclosure. Thus, the described component, feature, detail, structure, and/or embodiment is not intended to be limiting, required, or exclusive/exhaustive; and other components, features, details, structures, and/or embodiments, including structurally and/or functionally similar and/or equivalent components, features, details, structures, and/or embodiments, are also within the scope of the present disclosure.

FIG. 1 is a schematic diagram of an illustrative temperature monitoring system 10 in which a temperature buffering device of the present disclosure can be used. In some embodiments, the temperature monitoring system 10 comprises a temperature monitoring device such as digital data logger (DDL) 12 configured for data logging and monitoring. The DDL 12 is configured to receive and keep tracking temperature readings, and issue an alarming when a measured temperature exceeds a threshold. The digital data logger (DDL) 12 enables temperature data storage, so that any "temperature excursions" can be reviewed for a period of time. The temperature monitoring system 10 further comprises a temperature probe 14 coupled to the DDL 12 to measure the temperature and send the temperature reading to the DDL 12. The temperature probe 14 is coupled to the DDL 12 by a cable or wirelessly. The temperature probe 14 may be a thermocouple, a resistance temperature detector (RTD) or any appropriate temperature probe suitable for temperature measurement in a temperature-controlled environment. For example, the temperature-controlled environment may be a vaccine refrigerator that requires the temperature to be maintained at a temperature range of 2° C. to 6° C. (36° F. to 46° F.) or a vaccine freezers that requires the temperature to be maintained at a range of −50° C. to −15° C. (−58° F. to 5° F.). The temperature-controlled environment may be a storage room of a storage apparatus that requires the temperature to be maintained within a certain range.

The environmental conditions can cause temporary changes or spikes in temperature in a storage room. For example, a storage apparatus may be a refrigerator or a freezer. The opening and closing of the door of the refrigerator or the freezer causes temperature changes in the storage room and results in spikes on temperature readings. In some applications, a transient temperature change would not cause the issues for the products stored in the temperature-controlled environment, and it is not necessary to trigger alarming for such temperature change. The temporary temperature changes should be dampened so that the temperature measured by a temperature probe reflects a temperature of the samples/items stored in the temperature-controlled environment.

In some embodiments of the present disclosure, the temperature probe 14 is placed in a temperature buffering device 16 so that the measured temperature is buffered to reduce short time fluctuations caused by sudden environmental condition changes. The temperature buffering device 16 is configured to reduce the fluctuation on temperature reading measured by the temperature probe 14.

Figure 2:
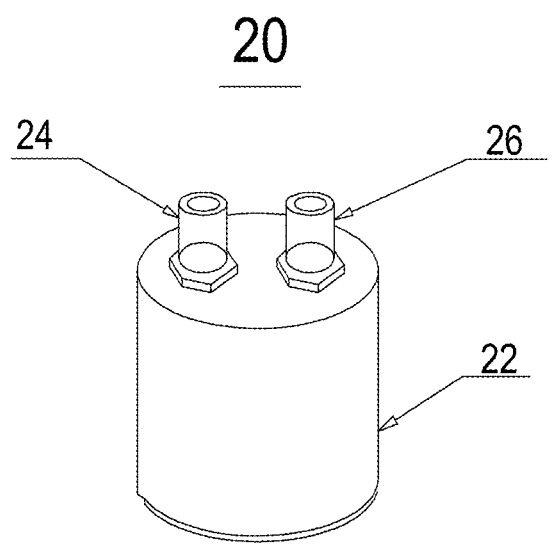
FIG. 2 is a perspective view of an illustrative temperature buffering device in accordance with aspects of the present disclosure.
Figure 3:
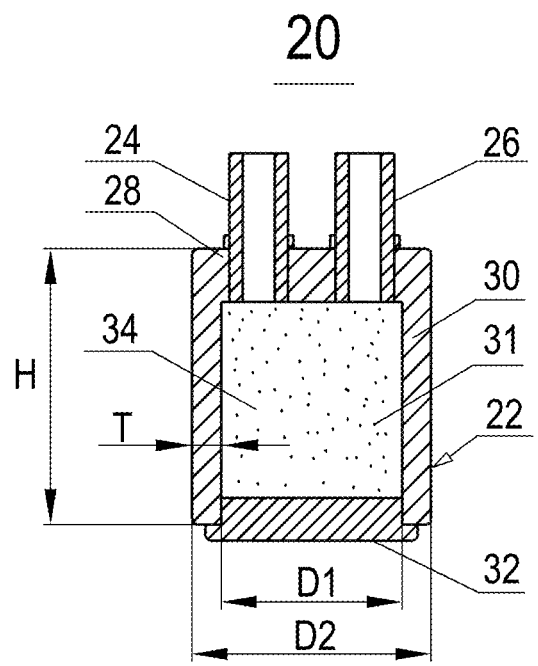
FIG. 3 is a cross-sectional view of the temperature buffering device illustrated in FIG. 4 is a top view of the temperature buffering device illustrated in FIG. 2.
Figure 4:
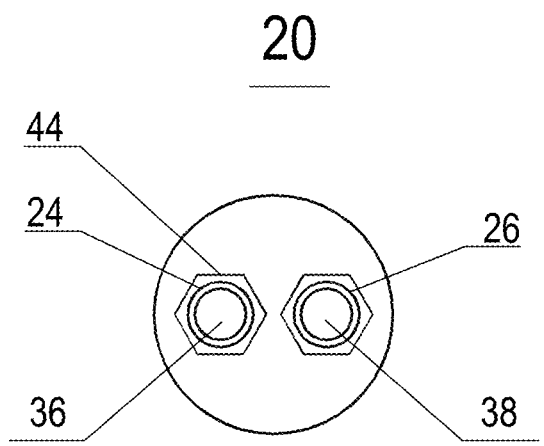

FIG. 2 is a perspective view of an illustrative temperature buffering device 20 in accordance with some embodiments of the present disclosure, FIG. 3 is a cross-sectional view of the temperature buffering device 20, and FIG. 4 is a top view of the temperature buffering device 20. Referring to FIG. 2 and FIG. 3, the temperature buffering device 20 comprises a body 22 which includes a chamber 34 configured to receive a fluid medium 31, and at least one probe holder 24 to receive a temperature probe (not shown). In the illustrated embodiments, The temperature buffering device 20 includes a first probe holder 24 and a second probe holder 26.

The body 22 may be made of thermally conductive material. Thermally conductive materials are substances that are capable of efficiently transferring heat. In some embodiments of the present disclosure, the body 22 is made of stainless steel. In some embodiments of the present disclosure, the body 22 is made of thermally conductive material with thermal capacity comparable to stainless steel. It should be appreciated that any suitable thermally conductive materials may be used for the body 22. The suitable thermally conductive material for the body 22 may include metal, alloy, compound or non-metal material such as ceramic material that has a certain thermal conductivity that can achieve the temperature buffering effectiveness together with the fluid medium 31 in the chamber 34.

Referring to FIG. 3, the body 22 may include a top wall 28, a sidewall 30, and a bottom wall 32. In some embodiments, the top wall 28 and a sidewall 30 may be integrally formed. The top wall 28 is configured to allow the insertion of a temperature probe into the chamber 34. The top wall 28 includes at least one opening to receive the temperature probe. With further reference to FIG. 4, in the illustrated embodiment, the top wall 28 includes a first opening 36 and a second opening 38 to allow the insertion of the first probe holder 24 and the second probe holder 26. The first probe holder 24 and the second probe holder 26 are coupled to the top wall 28.

In some embodiments, the inside of the body 22 has a cylinder shape. That is, the inner configuration of the sidewall 30 has a cylindrical shape, and the body 22 has an inner diameter D1 and an outer diameter D2. The thickness of the sidewall may be significantly less than the inner diameter D1. In some embodiments, a thickness of the sidewall 30 is T. The inner diameter D1 is greater than the thickness T.

It should be appreciated that an outer wall of the body may have any appropriate shapes. For example, the chamber formed by the sidewall has a cylindrical shape while the outer wall of the body may have a square shape or other geometric shape configured to fit into a place in a temperature-controlled environment or configured to have certain mass to achieve a desired buffering effect. The chamber (the inside space) formed by the sidewall can also have any appropriate shapes such as a square or a rectangular.

In some embodiments, the fluid medium 31 contained inside the chamber 34 is air.

Alternatively, the fluid medium may be any fluids that can function as buffer, which include, but are not limited to liquids such as glycol or water.

Figure 5:
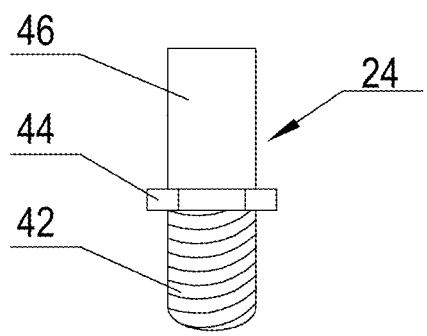
FIG. 5 is a perspective view of an illustrative probe holder of a temperature buffering device according to some embodiments of the present disclosure.

In some embodiments, the first probe holder 24 and the second probe holder 26 are removably connected to the top wall 28. Referring to FIG. 3 and FIG. 5, the first probe holder 24 is a tubing having a thread portion 42 to be matched with a thread inside a hole 36 of the top wall 28 and a upper portion 46. The first probe holder 24 may further include a stop 44 located between the upper portion 46 and the thread portion 42 and configured to be seated above the top wall 28. The probe holder 24, 26 may be made of the same material as the body 22. In some embodiments, the probe holder 24, 26 may be made of a material different from the body 22.

Alternatively, in some embodiments, a probe holder may be removably connected to the top wall by a snap-fit or other appropriate fitting mechanism. In some embodiments, the probe holder may be a holding hole on the top wall. The holding hole is configured to allow a temperature probe to be inserted into the chamber. For example, a clip may be attached to the holding hole to allow the temperature probe to be insert and withdraw from the chamber. In another example, the holding hole may be coated with elastic material to enable the temperature probe to be inserted into the chamber and be held at a certain position inside the chamber while also enables a withdrawal of the temperature probe from the chamber.

In some embodiments, the first temperature probe in holder 24 is used for normal monitoring on temperature, and the second temperature probe in holder 26 is used for calibration to compare the temperature measured by the first temperature probe and the temperature measured by the second temperature probe.

It should be appreciated that the temperature buffering device 20 may include only one probe holder to receive a temperature probe which meets the requirement of a specific application.

Figure 6:
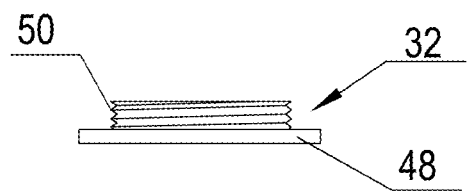
FIG. 6 is a perspective view of an illustrative bottom wall of a temperature buffering device according to some embodiments of the present disclosure.

In some embodiments, the bottom wall 32 is removably connected to the sidewall 30. Referring to FIG. 3 and FIG. 6, the bottom wall 32 is removably connected to the sidewall 30 by the way of threads. The bottom wall 32 includes a base 48 and an upper thread portion 50. Base 48 is located below the bottom of the sidewall 30 and the upper thread portion 50 is mated with an inner thread of the sidewall 30 at an installed state. As the bottom wall 32 is removably connected to the sidewall 30, it functions as a lid of the body 22, and the temperature probe inside the chamber 34 can be inspected by detaching the bottom wall 32 from the body 22.

It should be appreciated that the bottom wall can be coupled with the sidewall using any appropriate approach. In some embodiments, the bottom wall may be removably connected to the sidewall by way of a snap-fit mechanism. Alternatively, the bottom wall may be fixed to the sidewall depending on the material of the body and manufacturing process of making the body. In some embodiments, the top wall 28, the sidewall 30, and the bottom wall 32 are integrally formed.

According to some embodiments of the present disclosure, a temperature buffering device includes a body having a chamber and a fluid medium inside the chamber. The fluid medium inside the chamber of the temperature buffer device is air, and the body is made of stainless steel. The temperature buffering device can achieve buffering effectiveness and minimize fluctuations for accurate readings. Because no liquid is used as buffer, spills, evaporation, and maintenance associated with a liquid buffer (e.g., using glycol or water) can be eliminated. Further, the temperature buffering device of the present disclosure has advantages of longevity and ease of cleaning because of the use of stainless steel as a body.

According to one aspect of the present disclosure, a temperature buffering device for damping a temperature fluctuation is provided. The temperature measured is a temperature in a temperature-controlled environment such as a refrigerated storage room, and the temperature is measured by any appropriate temperature probe. The temperature buffering device comprises a body, a probe holder and a fluid medium inside a chamber in the body. The body has a top wall, a sidewall and a bottom wall, and the top wall, the sidewall and the bottom wall form a chamber 34 to receive the fluid medium. The probe holder is positioned on a body and adapted to allow a temperature probe to be inserted into the chamber. The body is made of thermally conductive material. The type of the fluid medium received in the chamber and the material and the mass of the body are configured such that the fluid medium and the body function together to damp transient temperature fluctuations.

The temperature buffering device of the present disclosure can be used in the temperature controlled environment with various temperature ranges for storage items. For example, the temperature buffering device can be used in vaccine refrigerators which are required to maintain a temperature range of 2° C. to 6° C. (36° F. to 46° F.) and vaccine freezers that are required to maintain a temperature range of −50° C. to −15° C. (−58° F. to 5° F.). In some embodiments, the body of the temperature buffering device is made of stainless steel or ceramic material and the temperature buffering device can be used in an even greater temperature ranges such as in an oven with temperature up to 140° C. or in a freezer with temperature of −80° C.

Figure 7:
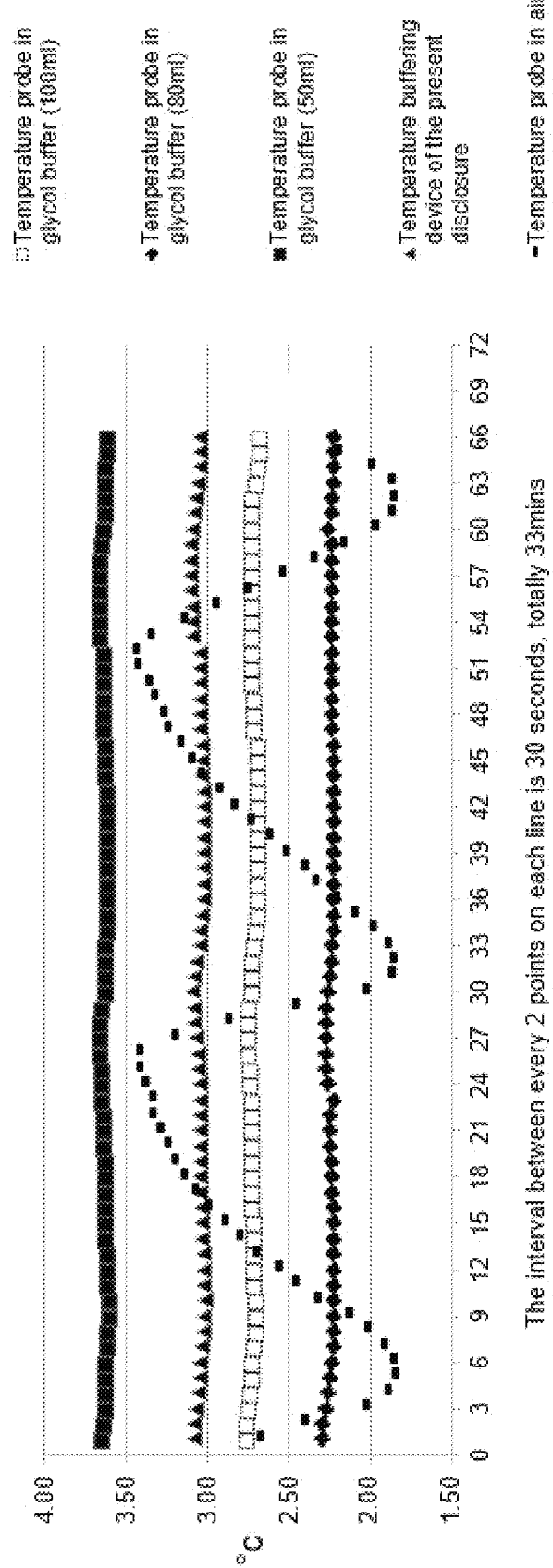
FIG. 7 shows experimental results which compare temperature damping of a temperature buffering device of the present disclosure and temperature burring devices using glycol buffers.

Experimentation results of a temperature buffering device according to some embodiments of the present disclosure are shown in FIG. 7. A temperature buffering device used in the test includes a body having a chamber and air inside the chamber. The inner diameter of the body is approximately 34 mm, the outer diameter is approximately 45 mm, and the height H of the body is approximately 55 mm. FIG. 7 is an illustrative diagram using a line chart to indicate the test results of the temperature buffering device. The vertical axis of the coordinate refers to temperatures in Celsius collected from tests and the horizontal axis refers to time intervals of 30 seconds between two temperature data recorded and recollected.

In FIG. 7, the line dotted with hollow-block markers in the line-chart diagram presents temperature fluctuation data resulting from a test using a vessel filled with 100 mL glycol as a buffer. The test data recorded and collected from the probe inserted in the vessel indicate temperature fluctuations between 2.68° C.-2.75° C., with a fluctuation range of 2.72° C.±0.04° C.

The line dotted with diamond-shaped markers in the line-chart diagram presents temperature fluctuations resulting from another test using a vessel filled with 80 mL glycol as a buffer. The test data recorded and collected from the probe inserted in the vessel indicate temperature fluctuations between 2.22° C.-2.29° C., within a fluctuation range of 2.26° C.±0.04° C.

The line dotted with square-block shaped markers in the line-chart diagram presents temperature fluctuations resulting from yet another test using a vessel filled with 50 mL glycol as a buffer. The test data recorded and collected from the probe inserted in the vessel indicate temperature fluctuations between 3.60° C.-3.65° C., within a fluctuation range of 2.63° C.±0.03° C.

The line dotted with triangle shaped markers in the line-chart diagram presents temperature fluctuations resulting from a test using the temperature buffering device in accordance with some embodiments of the present invention. The test data recorded and collected from the probe inserted in the vessel indicate temperature fluctuations between 3.01° C.-3.10° C., within a fluctuation range of 3.06° C.±0.05° C.

For comparison purposes, a test is also conducted in a refrigerated environment without any buffering device. The line dotted with rectangular shaped markers in the line-chart diagram presents temperature fluctuations resulting from the test without any buffering device, which results in much greater temperature fluctuations between 1.84° C.-3.44° C. Its range of fluctuations is as large as 2.64° C.±0.8° C.

As shown by the experimentation results, the temperature buffering device of the present disclosure can achieve buffering effect comparable to a traditional temperature buffering device (i.e., glycol-filled bottles) in the applications. Among other benefits, illustrative embodiments and examples are durable and have longevity, ease of cleaning on the device and inspection on the temperature probe. Further, the temperature buffering device illuminate the problems of spills, evaporation and maintenance associated with glycol-filled bottle. In the application in which two probe holders are available in the temperature buffering device, the location of a temperature probe and a calibration temperature probe in the same chamber or any fluid communicable chamber can ensure the calibration accuracy by the calibration temperature probe because both the fluid medium (e.g., air) surrounding the temperature probes is substantially uniform in terms of temperature because of fluidity of the air.

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A temperature buffering device for dampening a temperature fluctuation measured by a temperature probe in a temperature-controlled environment, the temperature buffering device comprising:
   a body having a top wall, a sidewall and a bottom wall, wherein the top wall, the sidewall and the bottom wall form a chamber, wherein the body is made of a thermally conductive material, and wherein an inner diameter of the chamber is greater than a thickness of the sidewall;
   a first probe holder positioned on the top wall and adapted to receive a first temperature probe, wherein the first temperature probe is used for normal monitoring of a temperature; and
   a second probe holder positioned on the top wall and adapted to receive a second temperature probe;
   wherein the chamber is entirely filled with air, and the air in the chamber and the body are configured to function as a buffer to dampen the temperature fluctuation; and
   wherein the first temperature probe and the second temperature probe are in direct contact with the air in the chamber.

2. The temperature buffering device of claim 1, wherein the thermally conductive material is an alloy or a ceramic material.

3. The temperature buffering device of claim 1, wherein the second temperature probe is used for calibration to compare a temperature measured by the first temperature probe and a temperature measured by the second temperature probe.

4. The temperature buffering device of claim 1, wherein the body, the first probe holder, and the second probe holder are made of the same thermally conductive material, and the thermally conductive material is stainless steel.

5. The temperature buffering device of claim 4, wherein the first probe holder and the second probe holder are removably connected to the top wall.

6. The temperature buffering device of claim 5, wherein the first probe holder and the second probe holder are removably coupled to the top wall via threads or snap-fit.

7. The temperature buffering device of claim 5, wherein an outer wall of the sidewall has a cylindrical shape.

8. The temperature buffering device of claim 7, wherein the bottom wall is removably connected to the sidewall through threads.

9. The temperature buffering device of claim 7, wherein the top wall, the sidewall and the bottom wall are integrally formed.

10. A temperature buffering device for dampening a temperature fluctuation measured by a temperature probe, the temperature buffering device comprising:
- a body having a top wall, a sidewall and a bottom wall, wherein the top wall, the sidewall, and the bottom wall form a chamber to receive a fluid medium, wherein the body is made of a thermally conductive material, and wherein an inner diameter of the chamber is greater than a thickness of the sidewall; and
- a first probe holder positioned on the top wall and adapted to receive a first temperature probe, wherein the first temperature probe is used for normal monitoring of a temperature;
- wherein the chamber is filled with air, and the air in the chamber and the body are served as buffering mediums to dampen the temperature fluctuation;
- wherein the body is made of metal, and the bottom wall is removably coupled to the sidewall; and
- wherein the first probe holder is configured to allow the first temperature probe to be positioned in the chamber and the first temperature probe is in direct contact with the air in the chamber.

11. The temperature buffering device of claim 10, wherein the first probe holder is connected to the top wall through threads.

12. The temperature buffering device of claim 10, wherein the body and the first probe holder are made of the same material or made from different materials.

13. The temperature buffering device of claim 10, wherein the metal is stainless steel.

14. The temperature buffering device of claim 10, wherein the bottom wall is connected to the sidewall through threads or snap-fit.

15. The temperature buffering device of claim 10, wherein the first probe holder is removably connected to the top wall, wherein the first probe holder is a tubing, and an inner diameter of the tubing of the first probe holder is configured to receive the first temperature probe.

16. The temperature buffering device of claim 15, further comprising a second probe holder positioned on the top wall to receive a second temperature probe, wherein the second probe holder is a tubing and an inner diameter of the tubing of the second probe holder is configured to receive the second temperature probe and allow the second temperature probe to be positioned in the chamber, the second temperature probe being in direct contact with the air in the chamber.

17. A temperature buffering device for dampening a temperature fluctuation measured by a temperature probe, the temperature buffering device comprising:
- a body having a top wall, a sidewall and a bottom wall, wherein the top wall, the sidewall and the bottom wall form a chamber and;
- a probe holder positioned on the top wall and adapted to allow the temperature probe to be inserted and positioned in the chamber;
- wherein the body is made of thermally conductive material;
- wherein air in the chamber and the body are configured such that the air and the body function together to dampen an impact of a transient temperature fluctuation on the temperature probe positioned in the chamber; and
- wherein the temperature probe is in direct contact with the air in the chamber.

18. The temperature buffering device of claim 17, wherein the thermally conductive material has thermal conductivity comparable to stainless steel.

19. The temperature buffering device of claim 18, wherein the thermally conductive material is metal.

* * * * *